UNITED STATES PATENT OFFICE.

THOMAS A. EDISON, OF LLEWELLYN PARK, ORANGE, NEW JERSEY, ASSIGNOR TO EDISON STORAGE BATTERY COMPANY, OF WEST ORANGE, NEW JERSEY, A CORPORATION OF NEW JERSEY.

METALLIC FILM FOR USE WITH STORAGE-BATTERY ELECTRODES AND PROCESS OF PREPARING THE SAME.

No. 896,811.           Specification of Letters Patent.           Patented Aug. 25, 1908.

Application filed February 6, 1908. Serial No. 414,576.

*To all whom it may concern:*

Be it known that I, THOMAS ALVA EDISON, a citizen of the United States, residing at Llewellyn Park, Orange, county of Essex, and State of New Jersey, have invented certain new and useful Improvements in Metallic Films for Use with Storage-Battery Electrodes and Processes of Preparing the Same, of which the following is a description.

In the make-up of electrodes for my improved storage batteries, I have proposed the employment for addition to the active material of very thin flakes or scales of a metal which would not be affected, at least to an objectionable extent, by electrolysis in the alkaline solution, such as nickel or cobalt, or an alloy of the two. Such films are preferably made by electroplating a series of thin deposits on a suitable cathode, the films being separated by alternate deposits of a soluble metal which can be later dissolved so as to free the nickel or cobalt films. Two difficulties have been encountered in actual practice in connection with the manufacture of such films which it is the object of the present invention to overcome. In the first place, I find that when the films are produced by electroplating they present smooth and relatively polished surfaces, to which the particles of active material, such as nickel hydroxid, are enabled to adhere with very little tenacity, even when the particles are compressed into contact with the films under enormous pressure. Consequently, when any internal movement of the active particles within the electrode mass takes place, such as may be due to the charging and discharging operations or to gas pressure, or to other causes, opportunity exists for the active particles to separate from the films so as to thereby deteriorate the contact conditions within the mass. In the second place, I find that while under the perfect conditions of a laboratory experiment, nickel or cobalt, or other metallic films can be obtained which will be practically free of any impurity, yet, under commercial conditions where the films are to be made in large quantities, it is practically impossible to prevent the introduction of impurities which will do harm when used for battery work. The impurities which I have principally encountered in this connection have been iron and arsenic, the presence of which tend to result in the formation of objectionable oxids on the surface of the films, after the electrodes have been used for some time and have been subjected to a number of charging and discharging operations. The presence of these oxids on the films injuriously affects the contact conditions within the mass. In explaining how my invention is carried into effect, I will consider iron and arsenic as the only impurities which are to be expected, but it will be understood of course that if other impurities are encountered, the treatment may be suitably modified to eliminate them without departing from the spirit of the invention.

In carrying the invention into effect, I first secure the metal films by any suitable process, preferably by electrodeposition, and I preferably reduce them to the desired size for actual use, although it will be understood that the films may be in relatively large sheets or long strips and be cut up into the ultimate size after treatment. The films are preferably composed of metallic nickel on account of its cheapness, but other metals may be used, such as cobalt or an alloy of nickel and cobalt. The films are now subjected to an oxidizing operation, by which an oxidation will take place, penetrating a very slight distance below the surface. This oxidation is effected in any suitable way, such as by heating the films in an oxidizing atmosphere. The effect of the oxidation is not only to oxidize the surface particles of the metallic films, but also to oxidize the metallic impurities which may exist within the influence of the oxidizing effect, such as iron or arsenic. The films are now subjected to a reducing effect, preferably to hydrogen in the presence of heat, and the oxids are reduced to the metallic state. The films are now subjected to an acid treatment, which will have the effect of dissolving out any metallic impurity, which can be readily acted upon by reason of the previous oxidation and the consequent porous condition of the surface. For instance, when the impurity consists of arsenic the films may be subjected to a dilute solution of nitric acid, and when the impurity consists of iron, the films may be subjected to a dilute solution of hydrochloric acid; or if both impurities are present, the films may be subjected to a mixture of nitric and hydrochloric acids in dilute solutions. The treatment described does not objectionably affect the metallic nickel or cobalt surface of the films, since the iron or arsenic is much more soluble in the dilute acid than the nickel or cobalt which will be only slightly attacked. By thus oxidizing and then reducing the surfaces of the films, the shiny and polished effect will be removed, and the films will partake of a dull or matted appearance. Under the microscope, the surfaces thus treated appear to be pitted with innumerable excessively minute irregularities, the effect of which when the active material is tightly compressed into contact with the films, is to enormously increase the adhesion between the same, so that when used in the make-up of a storage battery electrode, the intimate contact between the active particles and the films will be always maintained, notwithstanding internal movement. In other words, the effect is somewhat the same as the great adhesiveness of a label on a roughened glass surface, compared with its ready tendency to pull off of a smooth surface.

It will, of course, be understood that when the films are sufficiently pure, and when no objectionable amount of impurities exist the special treatment for removing the impurities may be dispensed with, in which case the process will comprise the preliminary treatment of the films by an oxidizing agent and the subsequent reduction of the oxids so formed to the metallic state.

Having now described my invention, what I claim as new and desire to secure by Letters Patent is as follows:—

1. Insoluble metallic films for admixture with the active material of storage batteries, having minutely roughened or matted surfaces, substantially as and for the purposes set forth.

2. Nickel or cobalt films for admixture with the active material of storage batteries having minutely roughened or matted surfaces, substantially as and for the purposes set forth.

3. The process of treating insoluble metallic films for admixture with the active material of storage batteries, which consists in subjecting the films to a surface oxidation, and in afterwards reducing the oxid so formed to the metallic state, substantially as and for the purposes set forth.

4. The process of treating insoluble metallic films for admixture with the active material of storage batteries, which consists in subjecting the films to a surface oxidation and in afterwards subjecting the films to hydrogen in the presence of heat to reduce the oxid to the metallic state, substantially as set forth.

5. The process of treating insoluble metallic films for admixture with the active material for storage batteries, which consists in subjecting the films to a surface oxidation, in then reducing the oxidized surface to the metallic state, and in finally removing any metallic impurity present in the reduced surface, substantially as and for the purposes set forth.

6. The process of treating insoluble metallic films for admixture with the active material of storage batteries, which consists in subjecting the films to a surface oxidation, in then reducing the oxidized surface to the metallic state, and in finally treating the films with a dilute acid to remove the metallic impurities present, substantially as and for the purposes set forth.

This specification signed and witnessed this 4th day of Feby., 1908.

THOS. A. EDISON.

Witnesses:
 ANNA R. KLEHM,
 FRANK L. DYER.